(12) United States Patent
Bergmiller et al.

(10) Patent No.: US 7,731,275 B2
(45) Date of Patent: Jun. 8, 2010

(54) VEHICLE ROOF

(75) Inventors: Alexander Bergmiller, Augsburg (DE); Walter Schätzler, Starnberg (DE); Dominik Hölzel, Puchheim (DE); Robert Birndorfer, Weilheim (DE)

(73) Assignee: Stockdorf (DE)

( * ) Notice: Subject to any disclaimer, the term of this patent is extended or adjusted under 35 U.S.C. 154(b) by 0 days.

(21) Appl. No.: 12/237,901

(22) Filed: Sep. 25, 2008

(65) Prior Publication Data

US 2009/0085382 A1    Apr. 2, 2009

(30) Foreign Application Priority Data

Sep. 26, 2007   (DE) .................. 10 2007 046 170

(51) Int. Cl.
*B60J 7/00* (2006.01)

(52) U.S. Cl. ................................ 296/216.08

(58) Field of Classification Search ..... 296/216.01–224
See application file for complete search history.

(56) References Cited

U.S. PATENT DOCUMENTS 5,540,478 A * 7/1996 Schuch ..................... 296/210
6,409,258 B1 * 6/2002 Grimm et al. ......... 296/216.08
6,513,865 B1 * 2/2003 Lutz et al. ............. 296/216.01

FOREIGN PATENT DOCUMENTS

DE    43 13 555    5/1994

* cited by examiner

*Primary Examiner*—Dennis H Pedder
(74) *Attorney, Agent, or Firm*—Fitch, Even, Tabin & Flannery; John M. Naber

(57) ABSTRACT

The invention relates to a vehicle roof with a roof opening with a flange surrounding the roof opening, on which a roof module with a roof frame comprising at least one frame member can be inserted through the roof opening from above, with guide rails arranged on the roof frame and with at least one roof section supported on these guide rails can be attached. The invention teaches that the roof frame is provided with a sealing frame which surrounds all sides of the roof opening which can be attached onto the flange from above, on which the guide rails and the frame members are attached, and which is sealed by means of at least one seal against the flange, and that furthermore mounting elements are provided through which the guide rails on the underside of the flange can be connected to it.

13 Claims, 5 Drawing Sheets

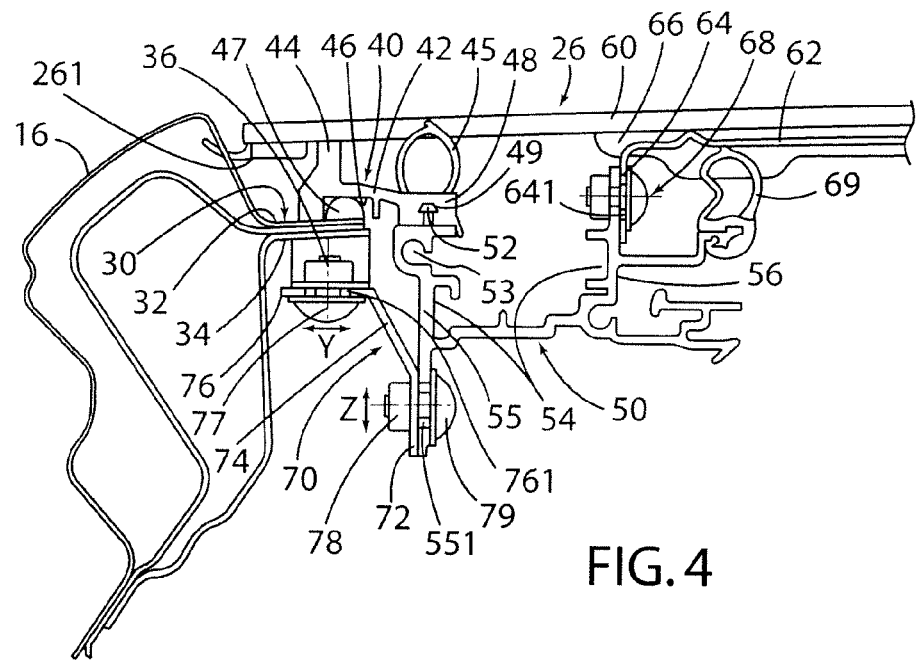
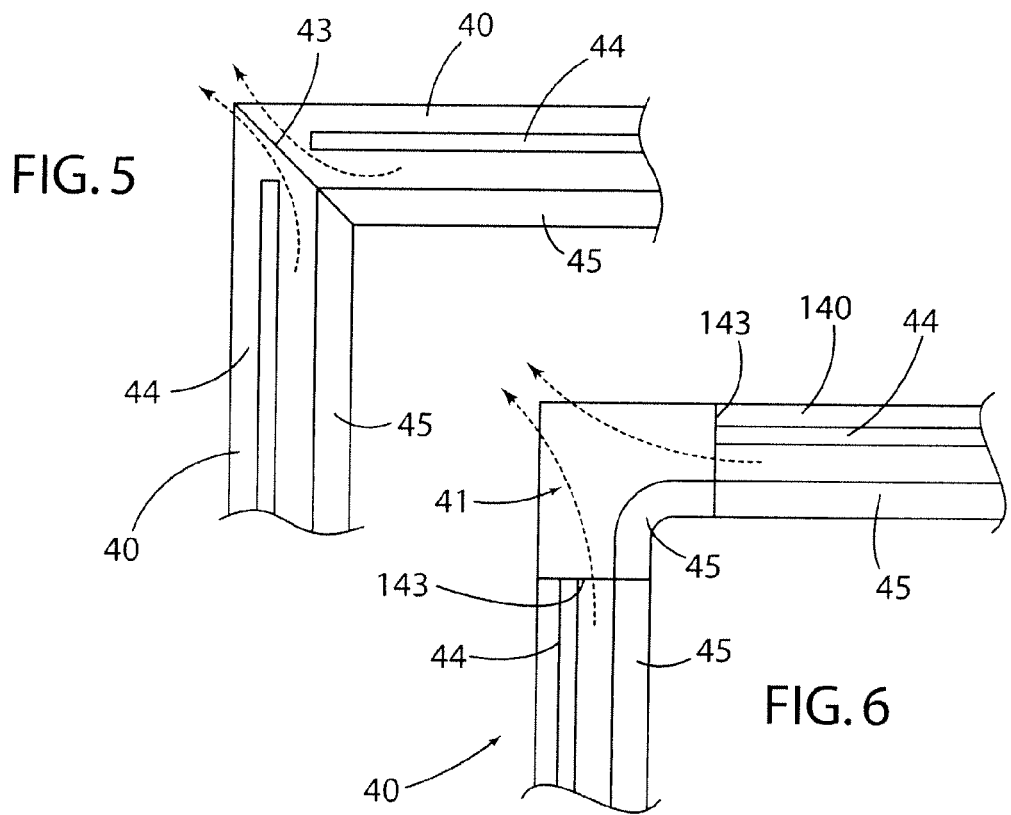

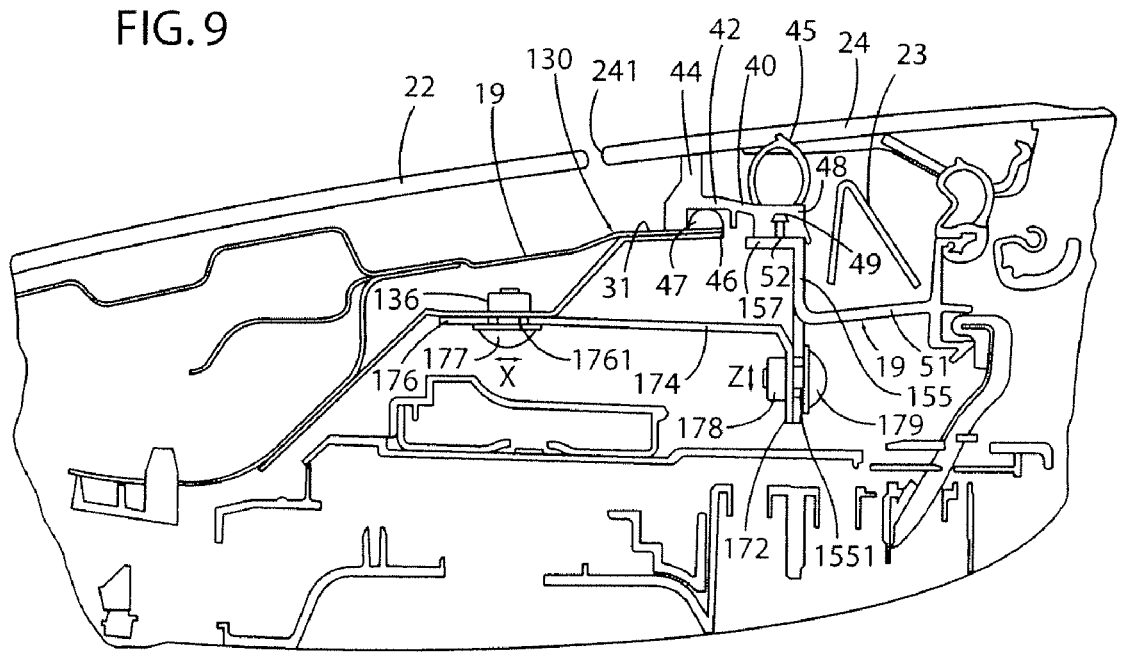

VEHICLE ROOF

This application claims priority from German Patent Application No.: DE 102007 046170.6, filed Sep. 26, 2007, the contents of which are herein incorporated by reference.

The invention relates to a vehicle roof according to the generic part of Claim 1.

DE 43 13 555 C1 discloses a vehicle roof with a roof module with flanges on the inside, which can be inserted from above into a large roof opening.

The supporting roof frame is bonded to the upper side of the flange using an adhesive bead and is laterally attached through screw joints to the roof rails. Multi-part roof frames require increased effort for sealing during installation, because all butt joints between the frame members have to be carefully individually sealed. Multi-part roof frames result in higher costs for tools, because each vehicle type requires its own large tool.

The object of the invention is to provide a vehicle roof in which the roof module can be completely preassembled at the vehicle subcontractor and be attached easily and watertight on the flange of the body-in-white in the area of the roof opening.

The invention teaches that this object is solved by the characteristics of Claim 1. Advantageous embodiments of the invention can be found in the sub-claims.

The essence of the invention is that the roof module is provided with a sealing frame which is closed all around on all sides of the roof opening, which is attached to guide rails and frame members of a modular roof frame, which is sealed with at least one seal against the flange, and that furthermore mounting elements are provided which can be connected to the flange through the guide rails on the underside of the flange. Through the sealing frame, a water-tight connection of the roof module with the flange is ensured without requiring additional measures during the installation in the vehicle, such as the application of sealing or adhesive beads.

The sealing frame is preferably made from a plastic extrusion profile, in particular ethylene propylene diene monomer (EPDM), whereby the corner areas are formed either as vulcanized butted areas, for example as a mitered joint using an angle of 45°, or from vulcanized corner elements onto which the extrusion profiles are vulcanized as butt joints. The corner areas can also be partially disengaged from the angled extrusion profiles and be supplemented by corner elements which are vulcanized to them.

In this instance, the inside area should preferably always be provided with a continuous seal.

The sealing frame is preferably provided with a stem that extends vertically to the top, which serves as a defined spacer between the flange and the roof section which is adjacent to the upper side of this stem.

The sealing frame has a seal mount which is preferably facing down for accepting the seal on its bottom, which bears against the upper side of the flange. This can be fitted into the seal mount as a permanently elastic sealing bead, made of butyl, for example. This can be done through bonding or injection. It can also be designed as a softer seal directly on the extrusion profile of the sealing frame. Alternatively, the seal can also be arranged on the upper side of the flange, prior to mounting the roof module.

In addition, the sealing frame also has a support near its inside edge, preferably on the underside, for attachment to the guide rail and/or to a frame member of the roof frame. This attachment is preferably realized in the form of a clip-on connection.

In addition, the sealing frame has a seal on the upper side near its inside edge which bears against the inside of the roof section that lies above it. This seal is preferably designed in the form of one piece on the extrusion profile of the sealing frame, whereby the seal has a higher percentage of plasticizers, for example, preferably from a softer plastic material (with a 20-45 shore hardness, particularly preferred from ethylene propylene diene monomer (EPDM) or sponge rubber) than the remaining part of the seal frame with a shore hardness of approximately 90.

The mounting elements are preferably formed as bracket angles, which are connected through a vertical lower stem with the guide rail and through a horizontal upper stem with the underside of the flange. The attachment both on the guide rail as well as on the flange is preferably accomplished by means of screw joints, which are adjustably attached by means of elongated holes in horizontal direction (X or Y direction) and/or in vertical direction (Z direction).

The following illustrates exemplary embodiments of the vehicle roof as taught by the invention in greater detail, with reference to the drawing, as follows:

FIG. 4 is a part section according to the intersection line IV-IV in FIG. 3;

FIG. 5 is a schematic plan view of a corner of the sealing frame in a first embodiment;

FIG. 6 is a schematic plan view of a corner of the sealing frame in a second embodiment;

FIG. 9 is a part section according to the intersection line IX-IX in FIG. 3 through the flange in the area of the frontal section of the frame.

Figure 1:
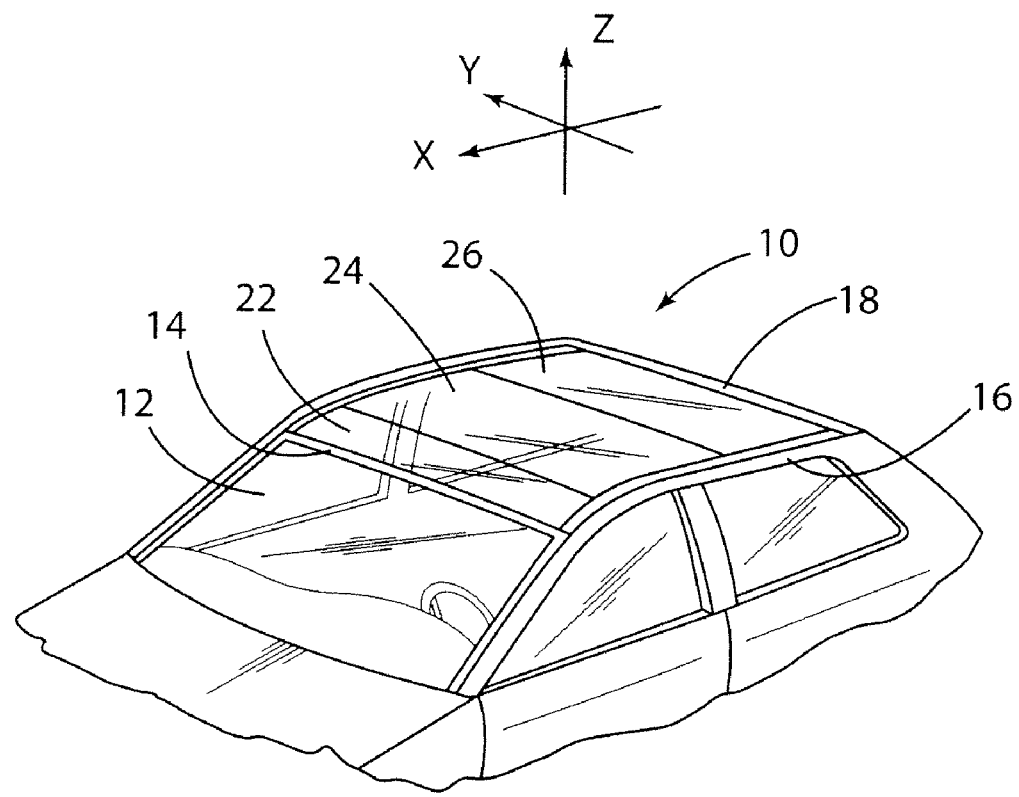
FIG. 1 is a schematic perspective partial view of a vehicle with a closed vehicle roof.
Figure 2:
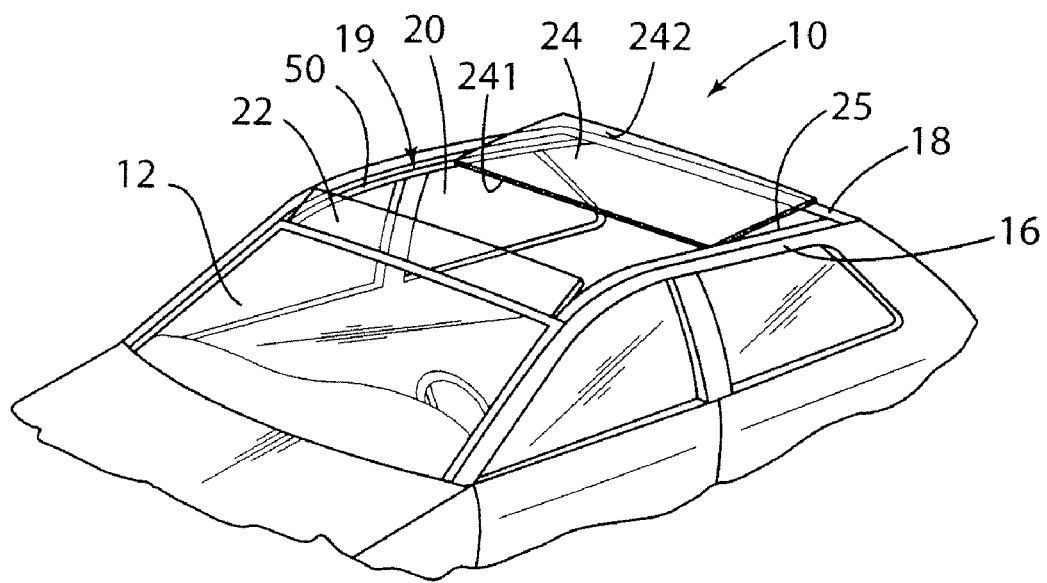
FIG. 2 is a schematic perspective partial view of the vehicle according to FIG. 1, with an opened vehicle roof.
Figure 3:
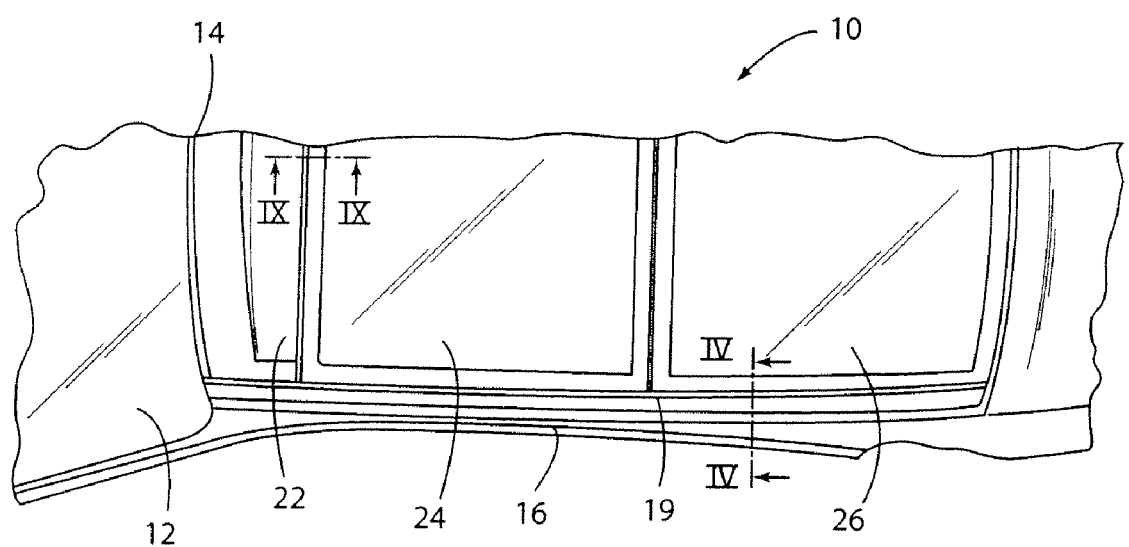
FIG. 3 is a partial plan view of the vehicle according to FIG. 1.

The vehicle illustrated in FIGS. 1 and 2 has a cowl panel which runs across and which is joined to the top edge of a windshield and which has adjoining side spars on the side and which continue to the back and a rear transverse spar which connects the side spars. On the side spars as well as preferably also on the cowl panel and on the rear transverse spar, a flange which protrudes to the inside is formed on the inside, the inner edge of which forms the border of a roof opening, into which a roof module can be inserted from above.

The roof module is formed from a frontal fixed roof section which joins onto the cowl panel, which can optionally—as indicated in FIG. 2—also be designed as a tiltable draft deflector blade, an adjoining movable roof section to the rear and a fixed rear roof section.

The roof sections and are supported on a roof frame, which in its lateral areas is provided with guide rails or is formed there from these. The guide rails have guide tracks and cable channels for the guidance of drive cables which are not illustrated. These serve for actuating a mechanism which is only schematically indicated in FIG. 2 for actuating the movable roof section.

The rear edge of roof section can be tilted up about a pivot axis located near the front edge and can subsequently be shifted to the rear above the fixed roof section. The rear edge of the optionally provided draft deflector blade can also be tilted to the top, in order to guide the airstream above the then partially opened roof opening when the roof section is opened. When providing a fixed roof section (instead of the tiltable draft deflector blade), the draft deflector is arranged in the front roof area below the roof section (FIG. 9) which is lowered into a cavity of a frontal frame section of the roof frame when the roof section is closed, and which with the opened roof section is projected upward above the level of the vehicle roof by means of a spring which is not illustrated here, in order to guide the airstream above the roof opening. The rear fixed roof section, as illustrated in FIG. 4, and optionally also the projectable draft deflector blade are supported on the guide rails.

The guide rails are connected with a sealing frame, which surrounds all sides of the roof opening in form of a continuous frame. The sealing frame (FIG. 6) is preferably constructed by plastic extrusion profiles, as shown in FIGS. 5 and 6, in the corner areas in form of a miter with a butt joint (FIG. 5) cut at an angle of 45°, or through two butt joints with a corner element insert made of plastic. The connection in the butt joints is done watertight in each case, by vulcanizing.

Figure 7:
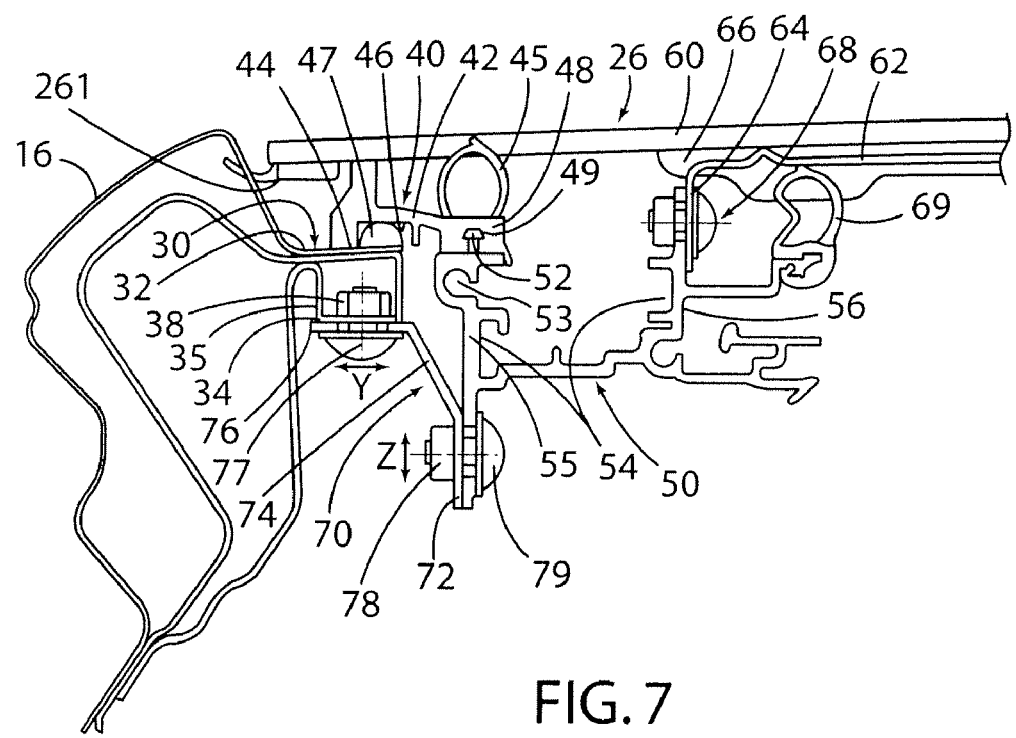
FIG. 7 is a variant to FIG. 4 with a different design of the underside of the flange.

Near the outer edge of the sealing frame, a stem is molded which extends vertically to the top, which, as illustrated in FIGS. 4 and 7, functions as a spacer between the upper side of the flange and the inside of the roof section (there 26). The underside of the stem 44 bears against the upper side of flange.

The stem can also be formed from several stem sections which are arranged at a distance to each other. On stem, an essentially horizontal section of the sealing frame adjoins on the inside, on whose underside—limited towards the outside by stem—a seal mount which is open towards the bottom for receiving a bottom seal is formed. The bottom seal is in the form of a permanently elastic butyl string-type gasket, for example, which is inserted, glued-in or injected into the seal mount. As an alternative, the bottom seal can also be applied to the upper side of the flange before the roof module is installed or can be constructed as a softer component in the form of one piece together with the extrusion profile of the sealing frame. The seal provides a peripheral watertight connection between the sealing frame and the flange, so that no water can penetrate from outside to the roof opening through the flange.

Near the inner edge of the sealing frame, a top seal is arranged on its upper side, which bears, as illustrated in FIGS. 4 and 7, as a seal against the underside of the roof sections (there, against roof section, and further to the front, against roof section). The top seal is preferably constructed in the form of one piece with the extrusion profile of the sealing frame. It is also non-segmented in the area of the butt joint (by mortising only the outer area of the extrusion profile in the corner area) or through vulcanizing together, optionally with a homogenous sealing profile on the corner element, formed as a continuous watertight seal.

On the underside of the horizontal section of the sealing frame, near the inner edge, a support with a mount which is open towards the bottom is constructed, which interacts with a mounting bracket of the guide rail as a positive connection. This connection is preferably designed as a clip-on connection. This connection holds together the guide rail with the sealing frame, in particular before the installation in the vehicle. It pulls the sealing frame against the upper side of flange, however, even after the installation in the vehicle. This connection, however, transmits no mechanical forces, such as generated through actuation of the roof sections. These are conducted from the guide rail through the mounting elements directly to the flange of the body.

The guide rail has on its outer section a vertical outer stem in the upper area on which the mounting bracket is arranged. The guide rail has a vertical inner stem near the inside. On this is, as shown in FIGS. 4 and 7, the fixed roof section with an inner panel which is arranged on the underside of its pane is attached, which is connected with the pane through a foamed plastic frame. The attachment in the area of a vertical stem which is angled to the bottom is done by means of a screw joint, the height of which can preferably be adjusted through an elongated hole on stem or on stem. Toward the vehicle interior, the guide rail and in particular the area of the screw joint are covered by means of the seal fitted onto a horizontal stem of the guide rail. This seal at the same time functions as an interior cover profile and also acts as an acoustic seal for improved soundproofing of the vehicle interior.

Between the vertical stems, the guide rail has several guide tracks as well as a cable channel, which serve for support and actuation of the mechanism of the movable roof section and for optional movement of the draft deflector mechanism, which is not illustrated.

On the lower end of the outer vertical stem, a vertical stem of a mounting element designed as a bracket angle bears against the outside. The bracket angle has a horizontal upper stem on its upper outer end, which serves for attachment to the underside of flange. The attachment of the vertical stem to the bracket angle or respectively to vertical stem is done by means of a bolt and a nut. The height of the screw joint which is formed from these which is constructed through an elongated hole, either in the vertical stem or, as illustrated in FIG. 4, by the vertical stem, is adjustable, such as indicated by arrow Z. The attachment of the horizontal stem of the mounting element on the underside of flange is done by means of a bolt, which is screwed from below into a nut which is attached to flange. The nut can be attached as a weld nut on the underside of flange. As an alternative thereto, the underside of the flange can, as illustrated in FIG. 7, also be in the form of a ribbing formed toward the bottom, into which a nut can be inserted as a positive connection. The connection of the bolt with the nut, respectively, is again adjustable in a transverse direction through an elongated hole which extends in a longitudinal direction in the horizontal stem, such as indicated by arrow Y.

During the installation, the roof module which was completely preassembled at the vehicle subcontractor is fitted on the upper side of flange together with the sealing frame attached to the guide rails. In this instance, as previously explained, the seal is already arranged in the seal mount or on the upper side of flange. Subsequently, on each side of the roof opening, several mounting elements are connected with a vertical stem of the guide rail and with the underside of the flange. For this purpose, the seal frame connected to the guide rail is pulled against the upper side of flange, as a result of which the seal is deformed and provides a watertight seal against the flange. On the outside of the roof sections, additional seal elements which are facing toward the roof rails can be provided for the roof section with the seal, such as illustrated in FIGS. 4 and 7. This seal forms a first barrier against water which penetrates from above. To the extent that water penetrates up to the upper side of the flange, however, the stem of sealing frame in conjunction with the seal forms an inner watertight boundary between the inner flank of the roof rail, the upper side of flange and the outside of the stem forming the water channel. Should any water from outside penetrate on the underside of the pane through the seal to the inside and at the same time also run across the upper side of the stem, then this water is retained by the top seal at the latest, and is drained off by the water channel formed between the inside of stem, the upper side of the horizontal section of the sealing frame and the outside of the top of seal into the corner areas, such as indicated by the arrows in FIGS. 5 and 6. For this purpose, the vertical stems are interrupted in the corner areas.

Figure 8:
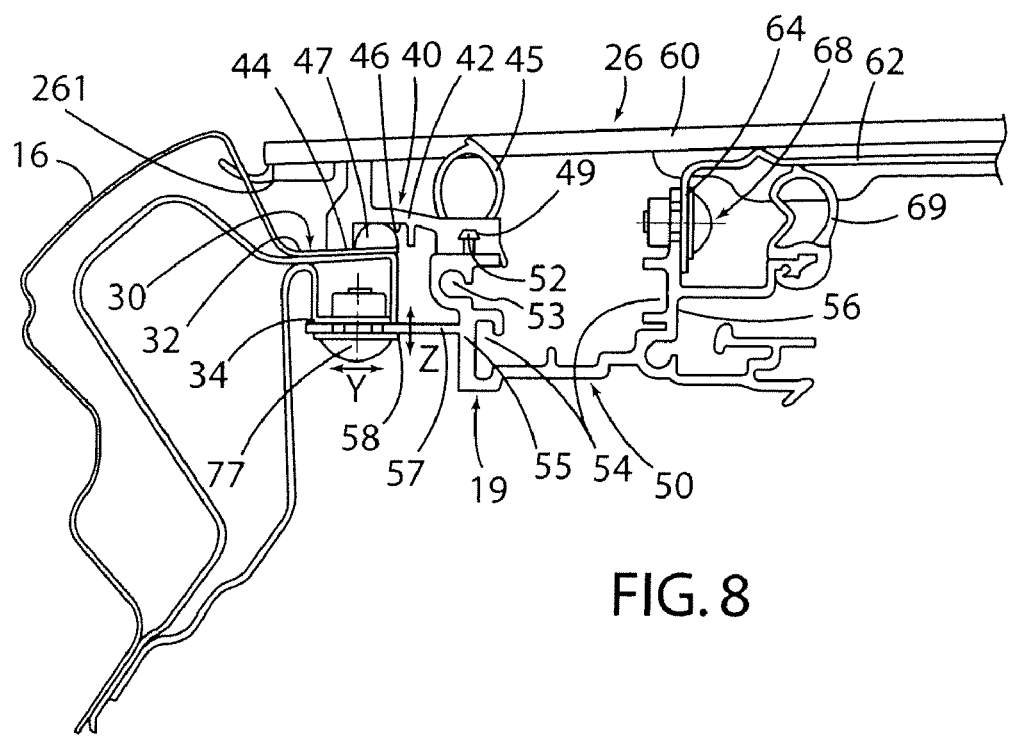
FIG. 8 is a further variant to FIG. 4 with a different design of the underside of the flange.

In the embodiment according to FIG. 8, different from FIGS. 4 and 7, the guide rail is designed as a horizontal stem which points directly to the outside, which serves for attachment on flange. This replaces the bracket-shaped mounting elements. The horizontal adjustment of the screw joint in the Y-direction is done through an elongated hole formed in the horizontal stem; the vertical adjustment in the Z-direction can be done through washers, if necessary.

FIG. 9 illustrates the frontal connection area between the roof module and the fixed vehicle roof. In this area, the sealing frame is connected with a horizontal stem of a frontal frame section through clip-on connection. The frontal frame section has a vertical stem. An elongated hole is formed in the lower area of this vertical stem, through which a mounting element in the form of a bracket angle is attached to a vertical stem by means of screw joint comprised of a bolt and a nut. A horizontal stem of the bracket angle which extends from the outside (to the front) has an elongated hole, through which it is connected with a screw joint formed by a bolt and a nut with a bottom flange panel extending from flange. Similar to the connection illustrated in FIG. 9, the roof frame can also be connected to the body in the area of the rear transverse spar through a rear frame section.

This invention enables a simple, watertight connection of a roof module with a roof vehicle to be made for safe operation, which can be completely preassembled at the vehicle subcontractor. The sealing frame preferably has sufficient stiffness so that it can support the guide rail at the frame sections during the insertion into the roof opening until such time, when their connection with a flange through the mounting elements has been completed.

The invention claimed is:

1. Vehicle roof with a roof opening with a flange surrounding the roof opening, on which a roof module with a roof frame comprising at least one frame member, which can be inserted through the roof opening from above, with guide rails arranged on the roof frame and with at least one roof section, supported on these guide rails, which can be attached, characterized in that the roof frame is provided with a sealing frame which surrounds all sides of the roof opening which can be attached onto the flange from above, on which the guide rails and the frame members of the roof frame are attached, and which is sealed by means of at least one seal against the flange, and that furthermore mounting elements are provided, through which the guide rails and the frame members of the roof frame on the underside of the flange can be connected to it, characterized in that a support is provided on the sealing frame for attaching the guide rail or the frame member.

2. Vehicle roof of claim 1, characterized in that the sealing frame consists of plastic extrusion profiles.

3. Vehicle roof of claim 2, characterized in that the extrusion profiles in the areas of the corners of the roof opening are vulcanized tightly together in a butt joint.

4. Vehicle roof of claim 2, characterized in that a corner element is provided in each corner area with which the extrusion profiles are vulcanized tightly together.

5. Vehicle roof of claim 1, characterized in that a stem which extends to the top is provided on the sealing frame which serves as a spacer to the inside of the roof section.

6. Vehicle roof of claim 1, characterized in that the seal is received in a seal mount (46) which is open towards the bottom.

7. Vehicle roof of claim 1, characterized in that a gasket which extends to the top is provided on the inside of the sealing frame to bear against the inside of the roof section.

8. Vehicle roof of claim 7, characterized in that the seal is formed as one piece on the extrusion profile of the sealing frame.

9. Vehicle roof of claim 8, characterized in that the seal is formed from a softer plastic than the remaining part of the sealing frame.

10. A vehicle roof with a roof opening with a flange surrounding the roof opening, on which a roof module with a roof frame comprising at least one frame member, which can be inserted through the roof opening from above, with guide rails arranged on the roof frame and with at least one roof section, supported on these guide rails, which can be attached, characterized in that the roof frame is provided with a sealing frame which surrounds all sides of the roof opening which can be attached onto the flange from above, on which the guide rails and the frame members of the roof frame are attached, and which is sealed by means of at least one seal against the flange, and that furthermore mounting elements are provided, through which the guide rails and the frame members of the roof frame on the underside of the flange can be connected to it, characterized in that the mounting elements are formed by bracket angles, which are connected through a vertical lower stem with the guide rail and through a horizontal upper stem with the flange.

11. Vehicle roof of claim 10, characterized in that the mounting elements are adjustably attached in a horizontal direction (Y-direction or X-direction) and/or on a vertical direction (Z-direction) through screw connections and elongated holes.

12. Vehicle roof of claim 1, characterized in that the connection between the sealing frame and the guide rail or the frame member is a clip-on connection.

13. Vehicle roof of claim 1, characterized in that the mounting elements are formed by bracket angles, which are connected through a vertical lower stem with the frame members and through a horizontal upper stem with the flange.

* * * * *